US012731876B2

(12) United States Patent
Royer et al.

(10) Patent No.: US 12,731,876 B2
(45) Date of Patent: Sep. 8, 2026

(54) APPARATUS FOR DISPENSING LIQUEFIED GAS ELECTROLYTE

(71) Applicant: SOUTH 8 TECHNOLOGIES, INC., San Diego, CA (US)

(72) Inventors: James Royer, San Diego, CA (US); Cyrus Rustomji, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 19/445,337

(22) Filed: Jan. 9, 2026

(65) Prior Publication Data

US 2026/0229751 A1 Aug. 6, 2026

Related U.S. Application Data

(60) Provisional application No. 63/753,005, filed on Feb. 3, 2025.

(51) Int. Cl.
*H01M 50/618* (2021.01)
*H01M 50/673* (2021.01)

(52) U.S. Cl.
CPC ....... *H01M 50/618* (2021.01); *H01M 50/673* (2021.01)

(58) Field of Classification Search
CPC .......................... H01M 50/618; H01M 50/673
USPC ........................................................... 141/32
See application file for complete search history.

(56) References Cited

U.S. PATENT DOCUMENTS

| | | | | |
|---|---|---|---|---|
| 10,608,284 | B2 * | 3/2020 | Rustomji | H01M 10/0569 |
| 10,873,070 | B2 * | 12/2020 | Royer | H01M 6/164 |
| 2019/0034865 | A1 | 1/2019 | Marolli | |
| 2020/0002096 | A1 | 1/2020 | Pollock | |
| 2023/0032720 | A1 | 2/2023 | Sakamoto | |

FOREIGN PATENT DOCUMENTS

| | | | | |
|---|---|---|---|---|
| DE | 102015208912 A1 * | 11/2016 | | H01M 50/618 |
| IT | BA20070004 A1 * | 7/2007 | | H01M 16/00 |

OTHER PUBLICATIONS

IT BA20070004 A1-English Translation (Year: 2007).*
DE 102015208912 A1-English Translation (Year: 2016).*
International Search Report for PCT/US2026/010826 dated Apr. 10, 2026. (7 pages).

* cited by examiner

*Primary Examiner* — Christopher M Afful
(74) *Attorney, Agent, or Firm* — Manuel de la Cerra

(57) ABSTRACT

Disclosed is an apparatus that transfers liquefied gas electrolyte (LGE) to electrochemical cells without the need for a temperature differential and without inducing an LGE phase change. The LGE comprises a liquefied gas solvent having a vapor pressure above 100 kPa at a temperature of 293.15 K and a salt. The apparatus utilizes a constant pressure cylinder to transfer LGE entirely in the liquid phase to an electrochemical cell.

20 Claims, 7 Drawing Sheets

14.1

16
17

20
23

22
26
27
25
24
28
21
30
29

27.X
28.X
29.X
21.X
30.X
6.X 48
47
45
46

49

52
51
50
53

APPARATUS FOR DISPENSING LIQUEFIED GAS ELECTROLYTE

CROSS-REFERENCE TO RELATED APPLICATIONS

This application is related to the following applications and patents, each of which is hereby incorporated by reference in its entirety: U.S. Pat. No. 10,608,284, issued on Mar. 31, 2020; U.S. Pat. No. 10,998,143, issued on May 4, 2021; U.S. Pat. No. 10,784,532, issued on Sep. 22, 2020; U.S. Pat. No. 11,088,396, issued on Aug. 10, 2021; U.S. Pat. No. 10,873,070, issued on Dec. 22, 2020; U.S. Pat. No. 11,342,615, issued on May 24, 2022; U.S. Pat. No. 11,049,668, issued on Jun. 29, 2021; U.S. Pat. No. 11,984,614, issued on May 14, 2024; U.S. Pat. No. 11,958,679, issued on Apr. 16, 2024; International Application No. PCT/US22/31594, filed on May 31, 2022; International Application No. PCT/US23/17720, filed on Apr. 6, 2023; International Application No. PCT/US23/28104, filed on Jul. 19, 2023; International Application No. PCT/US23/28105, filed on Jul. 19, 2023; International Application No. PCT/US24/16784, filed on Feb. 21, 2024; International Application No. PCT/US24/18746, filed on Mar. 6, 2024; International Application No. PCT/US24/33428, filed on Jun. 11, 2024; International Application No. PCT/US24/25771, filed on Apr. 23, 2024; International Application No. PCT/US24/31912, filed on May 31, 2024; U.S. Provisional Patent Application No. 63/534,213, filed on Aug. 22, 2023; U.S. Provisional Patent Application No. 63/418,703, filed on Oct. 24, 2022; International Application No. PCT/US24/27501, filed on May 2, 2024; International Application No. PCT/US24/31325, filed on May 29, 2024; U.S. Provisional Patent Application No. 63/652,616, filed on May 28, 2024; International Application No. PCT/US24/40203, filed on Jul. 30, 2024; U.S. patent application Ser. No. 18/788,809, filed on Jul. 30, 2024; U.S. patent application Ser. No. 18/643,134, filed on Apr. 23, 2024; U.S. patent application Ser. No. 18/807,938, filed on Aug. 17, 2024; U.S. Provisional Patent Application No. 63/684,297, filed on Aug. 16, 2024; U.S. Provisional Patent Application No. 63/700,731, filed on Sep. 29, 2024; U.S. Provisional Patent Application No. 63/700,733, filed on Sep. 29, 2024; U.S. Provisional Patent Application No. 63/703,927, filed on Oct. 5, 2024; U.S. Provisional Patent Application No. 63/703,928, filed on Oct. 5, 2024; and U.S. Provisional Patent Application No. 63/704,142, filed on Oct. 7, 2024.

FIELD OF THE INVENTION

This invention relates to systems and methods for filling liquefied gas electrolytes into electrochemical cells.

BACKGROUND OF THE INVENTION

Injection of liquefied gas electrolytes (LGE) into electrochemical cells requires controlled delivery systems and methods to ensure cell fill mass and composition accuracy. Typical systems and methods to transfer LGE into electrochemical cells may utilize fixed volume containers that may be at elevated temperatures relative to the electrochemical cell. The LGE may be transferred to the electrochemical cell due to the pressure differential that exists between the LGE source container and the electrochemical cell. As the LGE transfers from the source container to the electrochemical cell, the LGE liquid fills the electrochemical cell, but a portion of the LGE vaporizes and occupies the volume of the source container. This method may result in inaccuracies in cell fill mass and LGE composition due to the temperature control response and the loss of LGE vapor in the source container.

The prior art has demonstrated that the performance of electrochemical devices is greatly affected by the composition of the electrolyte. Deviations in the composition of the electrolyte can negatively impact the performance of electrochemical devices. For instance, inaccurate ratios of one electrolyte component to another may not allow for the full utilization of all the electrode capacity within the device.

A need exists for an apparatus and method that transfers LGE to electrochemical cells without the need for a temperature differential and without inducing a LGE phase change.

SUMMARY OF THE INVENTION

A setup for injecting liquefied gas electrolyte (LGE) into electrochemical cells is disclosed. The setup includes a compressed gas source, a constant pressure cylinder (CPC) that contains LGE, and an electrochemical cell. The CPC comprises a cylinder body, a pneumatic cavity, a piston, and a product cavity. A pressure regulator fluidly connects the outlet of the compressed gas source to the pneumatic cavity inlet of the CPC. The pressure regulator is set to a predetermined delivery pressure to pressurize the CPC pneumatic cavity. The pneumatic cavity is pressurized with compressed gas to a pressure greater than the vapor pressure of the LGE, such that the LGE is entirely in the liquid phase. Tubing may fluidly connect the compressed gas source to the CPC and the CPC to the electrochemical cell.

A valve may fluidly connect the CPC to the electrochemical cell to isolate the CPC after the electrochemical cell has been filled with LGE. A second valve may fluidly connect the pressure regulator and the CPC to isolate the CPC from the compressed gas source. An orifice may fluidly connect the pressure regulator and the second valve to restrict the flow of compressed gas to the CPC pneumatic cavity and dampen the pressure change in the pneumatic cavity. A loading volume may fluidly connect the CPC and the electrochemical cell. The loading volume may be sized to contain the desired volume of LGE for the electrochemical cell. The loading volume may be temperature controlled with a heating element to accurately deliver LGE to the electrochemical cell.

A pump may fluidly connect the CPC and the electrochemical cell to facilitate the flow of LGE into the electrochemical cell. A mass flow meter (MFM) may fluidly connect the CPC and the electrochemical cell. The MFM may monitor the mass of LGE delivered from the CPC to the electrochemical cell. The MFM may be a mass flow controller (MFC) which may provide improved flow rate control and mass monitoring of the LGE delivered to the electrochemical cell.

An orifice may fluidly connect the CPC and the electrochemical cell. The orifice may be sized and calibrated to deliver LGE from the CPC to the electrochemical cell at a pre-determined flow rate.

A scale may be used to monitor the mass delivered from the CPC to the electrochemical cell. A second CPC may fluidly connect the first CPC and the electrochemical cell. The second CPC may be sized to have a smaller volumetric capacity than the first CPC. The second CPC may be sized to a volume capacity for a single electrochemical cell injection. The second CPC may be filled with LGE from the first CPC for subsequent electrochemical cell injections. The second CPC may be supplied with a second compressed gas source to control the pressure in the pneumatic cavity. The second compressed gas source may have a relief valve that allows the piston in the second CPC to retract and refill the product cavity with LGE. During the transfer of LGE from the first CPC to the second CPC, the LGE remains in the liquid phase due to the pressure in the pneumatic cavity on the second CPC.

A plurality of parallel CPC lines may be fluidly connected to the first CPC such that multiple electrochemical cells may be injected with LGE. The first CPC may supply LGE to a plurality of smaller CPCs, which each inject to electrochemical cells. The plurality of smaller CPCs may be refilled with LGE from the first CPC so that electrochemical cell injection throughput is maximized.

A container containing LGE may be fluidly connected to the CPC such that the container supplies the CPC with LGE liquid through an eductor tube. The container may be temperature controlled with a heating element so that the LGE in the container is warmer than the CPC and facilitates flow of LGE from the container to the CPC.

A temperature control element may control the temperature of the CPCs, tubing, valves, and cell so that the density of the LGE remains constant as it is transferred through the setup and into the electrochemical cell.

An inert gas supply and a vacuum pump may be fluidly connected to the tubing to allow the system to be evacuated and purged of atmospheric contaminants such as water and oxygen.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1:
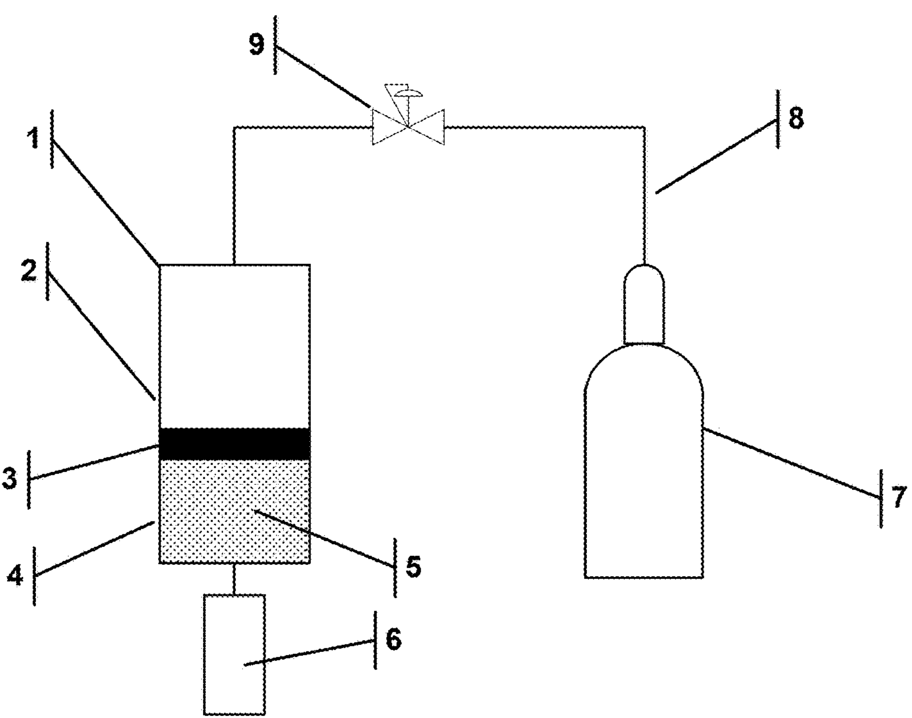
FIG. 1 is a block diagram showing a setup for LGE transfer from a CPC to an electrochemical cell.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Constant Pressure Cylinder (CPC) 1
Pneumatic Cavity (Pressure P1) 2
Piston 3
Product Cavity (Pressure P2) 4
Liquefied Gas Electrolyte (LGE) 5
Electrochemical Cell 6
Electrochemical Cell 6.X
Compressed Gas Source 7
Tubing 8
Pressure Regulator 9
Valve 10
Orifice 11
Valve 12
Loading Volume 13
Temperature Control Element 14
Pump 14.1
Valve 15
Mass Flow Meter (MFM) 16
Processor/CPU 17
Mass Flow Controller (MFC) 18
Orifice 19
Scale 20
Small Volume CPC 21
Small Volume CPC 21.X
Second Compressed Gas Source 22
Tubing 23
Pressure Regulator 24
Valve 25
Relief Valve 26
Orifice 27
Orifice 27.X
Valve 28
Valve 28.X
Valve 29
Valve 29.X
Valve 30
Valve 30.X
Container 45
Eductor Tube 46
Temperature Control Element 47
Valve 48
Temperature Control Element 49
Inert Gas Source 50
Valve 51
Tubing 52
Vacuum Pump 53

What follows are 13 non-limiting examples showing various embodiments of the present invention.

One such embodiment is the setup 1-1 illustrated in FIG. 1. In the setup 1-1, the CPC 1 contains LGE 5 in the product cavity 4 and pressurized gas in the pneumatic cavity 2. It is also possible to use hydraulic cylinders and hydraulic fluid to pressurize the pneumatic cavity 2. The pneumatic cavity 2 and product cavity 4 are separated by a piston 3. The piston 3 makes a seal with the sidewalls of the CPC 1 so that the pneumatic cavity 2 and product cavity 4 are fluidly isolated. The LGE 5 may have a vapor pressure above 100 kPa at a temperature of 293.15 K. One of ordinary skill in the art will recognize that when the pneumatic cavity 2 is pressurized sufficiently above the vapor pressure of the LGE 5, the product cavity 4 will contain only liquid and no vapor. The CPC pneumatic cavity 2 may be fluidly connected to a compressed gas source 7, through a pressure regulator 9, and tubing 8. The tubing 8 may be constructed from metal, plastic, or ceramic tubing or piping of variable size. In some embodiments, the tubing 8 may be, but is not limited to: 1/16-inch, 1/8-inch, 1/4-inch, 1/2-inch, 1-inch, or 2-inch outer diameter. The pressure regulator 9 may be a single stage regulator, dual stage regulator, or an electronic pressure controller. The pressure regulator 9 may control the pressure of the compressed gas in the pneumatic cavity 2 so that it is always of sufficient pressure to maintain LGE 5 in the CPC product cavity 4 entirely in the liquid state. The CPC product cavity 4 may be fluidly connected to an electrochemical cell 6. The CPC 1 may be a piston, syringe, or bellows style. The CPC 1 may have manual, electronic, motorized, hydraulic, or pneumatic actuation. The CPC 1 may contain an integrated mixer. The CPC 1 may have a volumetric capacity suitable for electrochemical cell injection which may be, but is not limited to: 0.1 cubic centimeter, 1 cubic centimeter, 10 cubic centimeters, 100 cubic centimeters, 1000 cubic centimeters, 10000 cubic centimeters, 100000 cubic centimeters, or 1000000 cubic centimeters.

Figure 2:
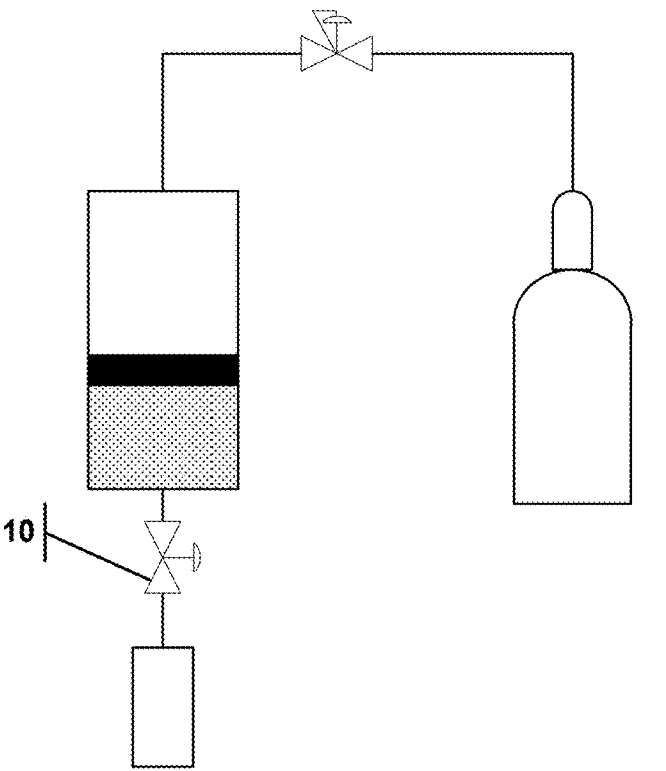
FIG. 2 is a block diagram showing a setup for LGE transfer from a CPC to an electrochemical cell, which further includes a valve.

Another embodiment is illustrated in FIG. 2. In setup 1-2, the CPC product cavity 4 is fluidly connected to the electrochemical cell 6 through a valve 10. The valve 10 allows the CPC 1 to be fluidly isolated from the electrochemical cell 6 so that the electrochemical cell 6 can be removed and additional electrochemical cells may be fluidly connected to the CPC 1 through valve 10 and filled with LGE 5.

The valves (10, 15, 25, 26, 28, 29, 30, 28.X, 29.X, 30.X, 48, 51) may include, but are not limited to: ball valves, diaphragm valves, needle valves, or butterfly valves.

Figure 3:
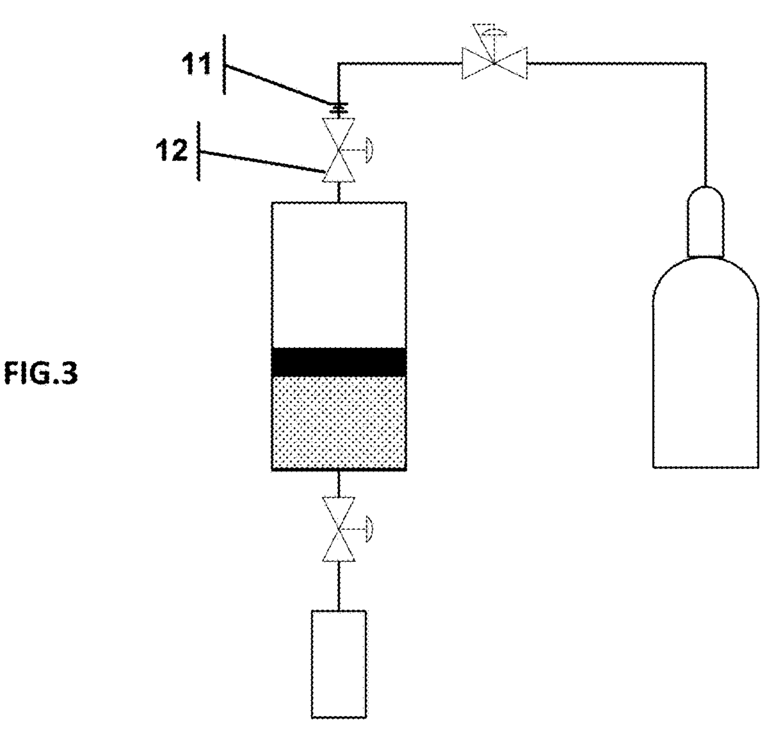
FIG. 3 is a block diagram showing a setup for LGE transfer from a CPC to an electrochemical cell, which further includes an orifice on the pneumatic cavity side of the CPC.

Another embodiment is illustrated in FIG. 3. In setup 1-3, the CPC pneumatic cavity 2 is connected to the pressure regulator 9 through an orifice 11 and a valve 12. The orifice 11 controls the flow of the compressed gas into the pneumatic cavity 2 and provides improved control of the CPC piston 3 motion.

Figure 4:
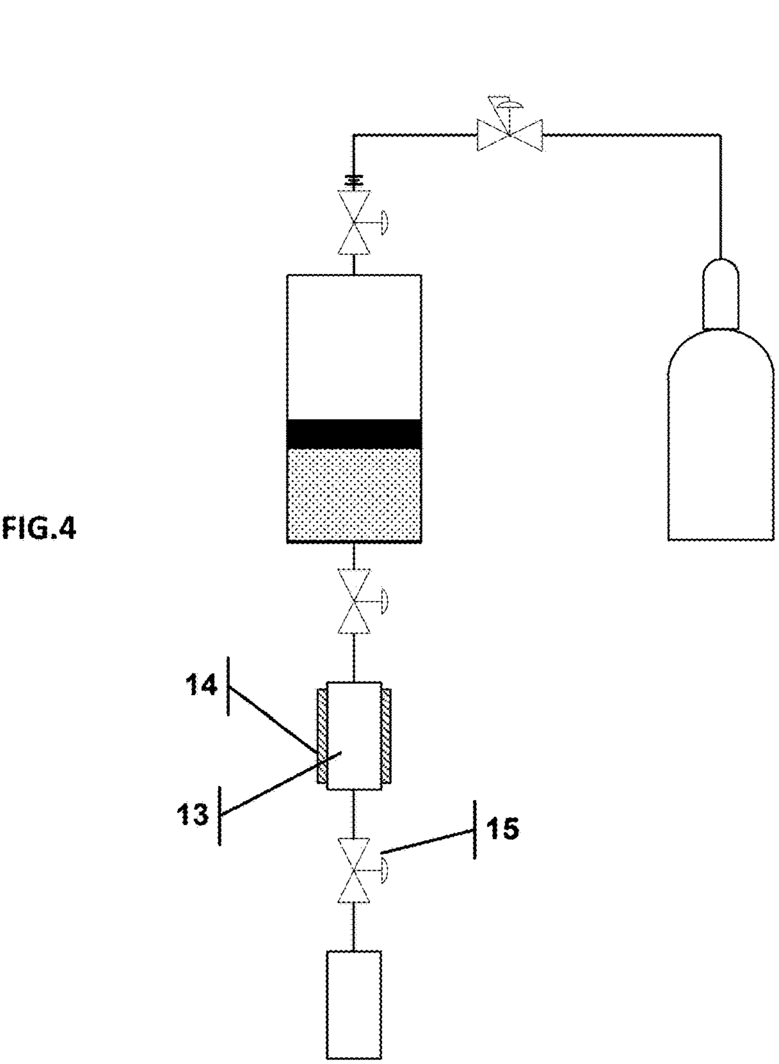
FIG. 4 is a block diagram showing a setup for LGE transfer from a CPC to an electrochemical cell, which further includes a loading volume.

Another embodiment is illustrated in FIG. 4. In setup 1-4, the CPC product cavity 4 is fluidly connected to the electrochemical cell 6 through a loading volume 13 and a valve 15. The loading volume 13 may be sized to match the required volume of LGE 5 to be injected to electrochemical cell 6. The loading volume 13 may be completely filled with LGE 5 when valve 10 is opened to the loading volume 13. The loading volume 13 may be temperature controlled with a heating element 14 so that the temperature of loading volume 13 is higher than the electrochemical cell 6. The valve 15 may be opened to allow LGE 5 to flow from the loading volume 13 to the electrochemical cell 6. One of ordinary skill in the art will recognize that the temperature difference between the loading volume 13 and the electrochemical cell 6 will facilitate flow of LGE 5 into the electrochemical cell 6. The loading volume 13 may be constructed from any suitable metal, plastic, or ceramic tubing or piping. The loading volume 13 may have a fixed volume, or an adjustable volume to accommodate different volumes of LGE 5. The loading volume 13 may be constructed to have straight walls or funneled walls. The loading volume 13 may have a diaphragm or elastic bladder accumulator. This method may improve reproducibility of the LGE injection process into electrochemical cells compared to the state-of-the-art injection process because the state-of-the-art process only utilizes temperature gradients to fill a loading volume with LGE as opposed to a constant pressure cylinder.

The heating elements (14, 47, 49) may be, but are not limited to: heating blankets, heating tape, heating rope, or thermally regulated enclosures.

Figures 4A, 5:
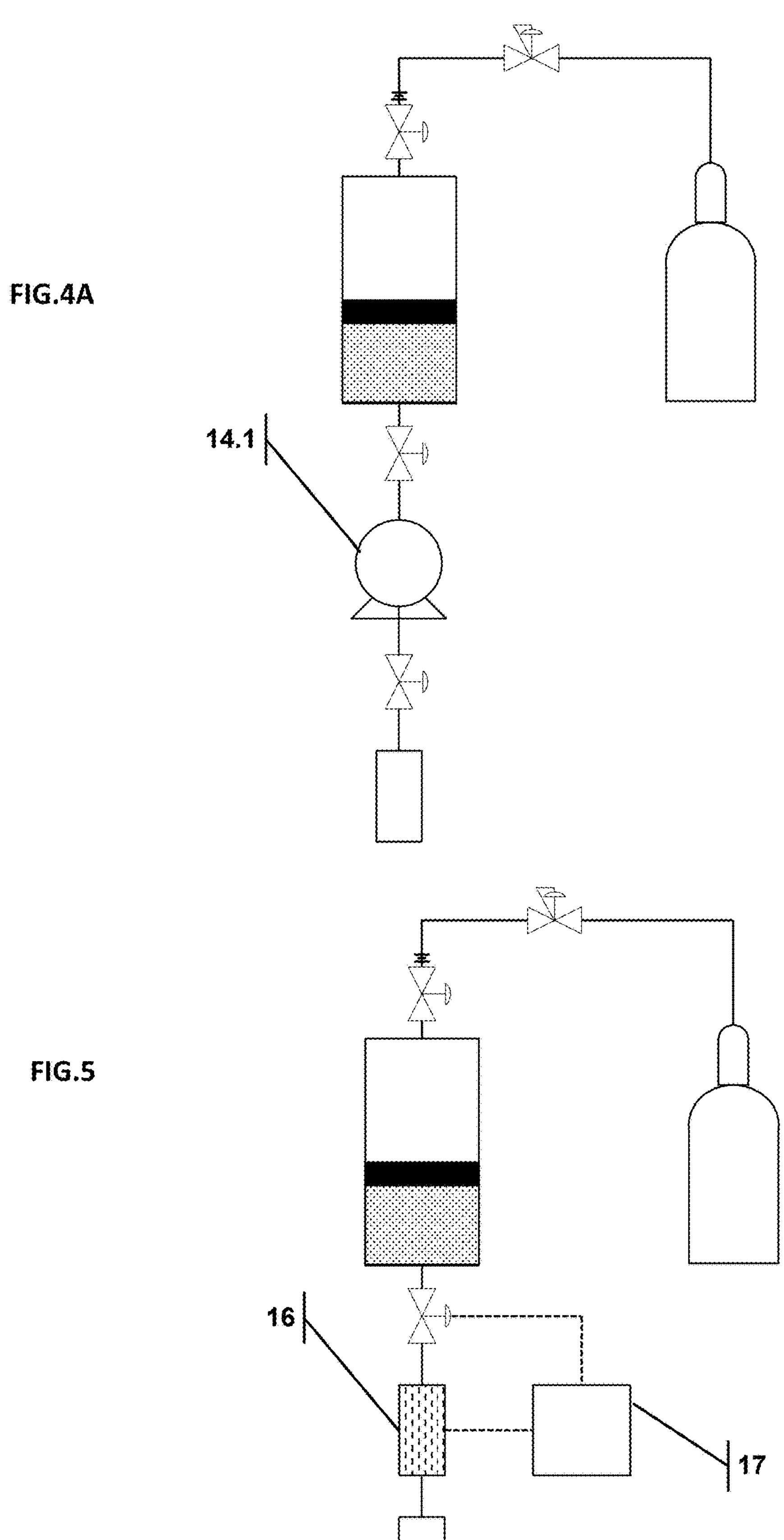
FIG. 4A is a block diagram showing a setup for LGE transfer from a CPC to an electrochemical cell, which further includes a pump.
FIG. 5 is a block diagram showing a setup for LGE transfer from a CPC to an electrochemical cell, which further includes a mass flow meter.

Another embodiment is illustrated in FIG. 4A. In setup 1-4A, the loading volume 13 is substituted for a pump 14.1. The pump 14.1 may be a peristaltic, centrifugal, diaphragm, piston, or any suitable pump to transfer LGE 5.

Another embodiment is illustrated in FIG. 5. In setup 1-5, the CPC product cavity 4 is fluidly connected to the electrochemical cell 6 through a mass flow meter 16 and a valve 10. The mass flow meter 16 records the LGE 5 mass flow into the electrochemical cell 6. A CPU 17 may be connected to the mass flow meter 16 and valve 10 so that once the target LGE 5 mass has been delivered to the electrochemical cell 6, the CPU 17 triggers valve 10 to close. A mass flow meter 16 may improve the LGE 5 mass delivery to the electrochemical cell 6 by providing an electronic feedback loop that can improve response time of the valve 10. The mass flow meter 16 may be a thermal, Coriolis or any suitable meter for measuring LGE 5 mass flow rate.

Figure 6:
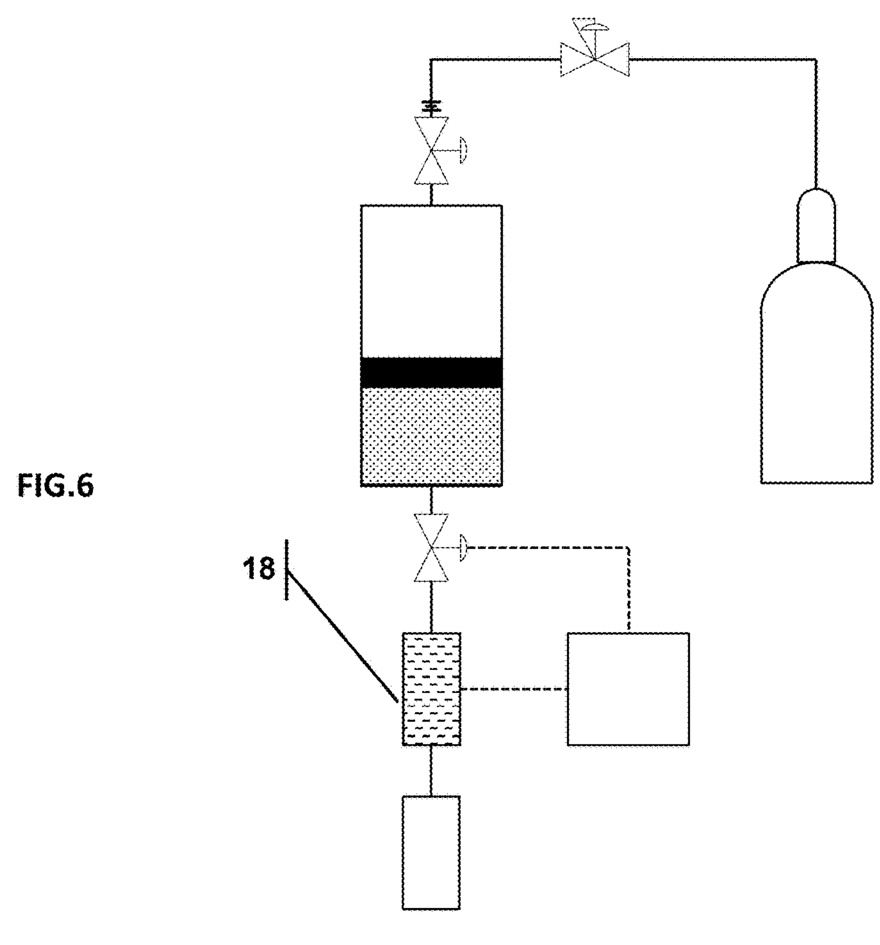
FIG. 6 is a block diagram showing a setup for LGE transfer from a CPC to an electrochemical cell, which further includes a mass flow controller.

Another embodiment is illustrated in FIG. 6. In setup 1-6, the CPC product cavity 4 is fluidly connected to the electrochemical cell 6 through a mass flow controller 18, and a valve 10. The mass flow controller 18 may control the LGE 5 flow rate into the electrochemical cell 6. A mass flow controller 18 may improve the LGE 5 mass delivery to the electrochemical cell 6 by controlling the flow rate of LGE 5 so that the temperature of the electrochemical cell 6 does not significantly change during LGE 5 injection. The mass flow controller 18 may be a thermal, Coriolis or any suitable controller for measuring LGE 5 mass flow rate.

Figure 7:
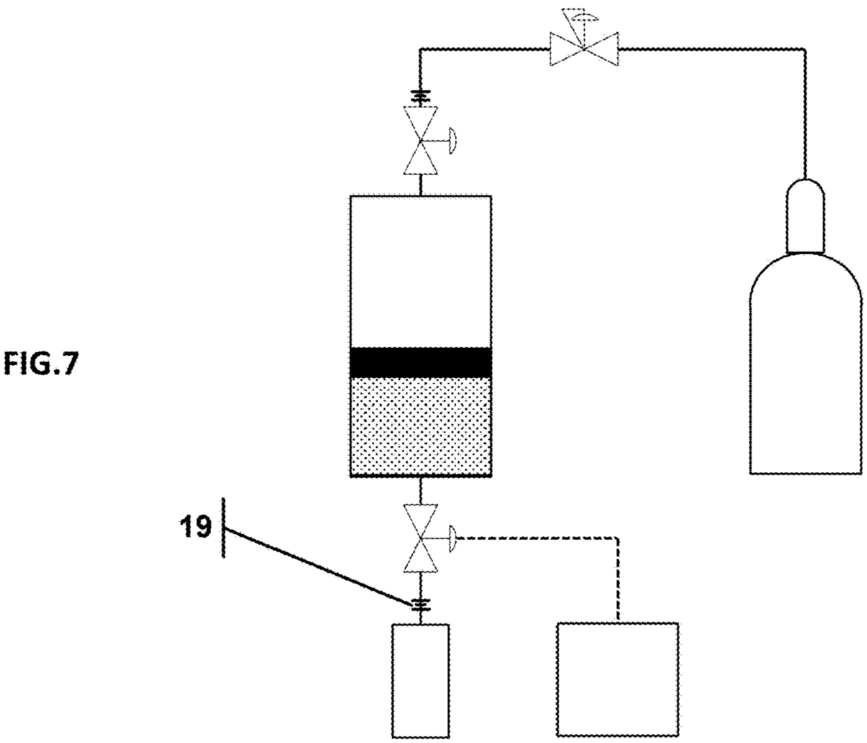
FIG. 7 is a block diagram showing a setup for LGE transfer from a CPC to an electrochemical cell, which further includes an orifice on the LGE delivery side of the CPC.

Another embodiment is illustrated in FIG. 7. In setup 1-7, the CPC product cavity 4 is fluidly connected to the electrochemical cell 6 through an orifice 19 and a valve 10. The orifice 19 may be sized to allow a specific flow rate of LGE 5 so that a CPU 17 can control the actuation of valve 10 to allow a specific LGE 5 mass flow into electrochemical cell 6.

Figures 8, 9:
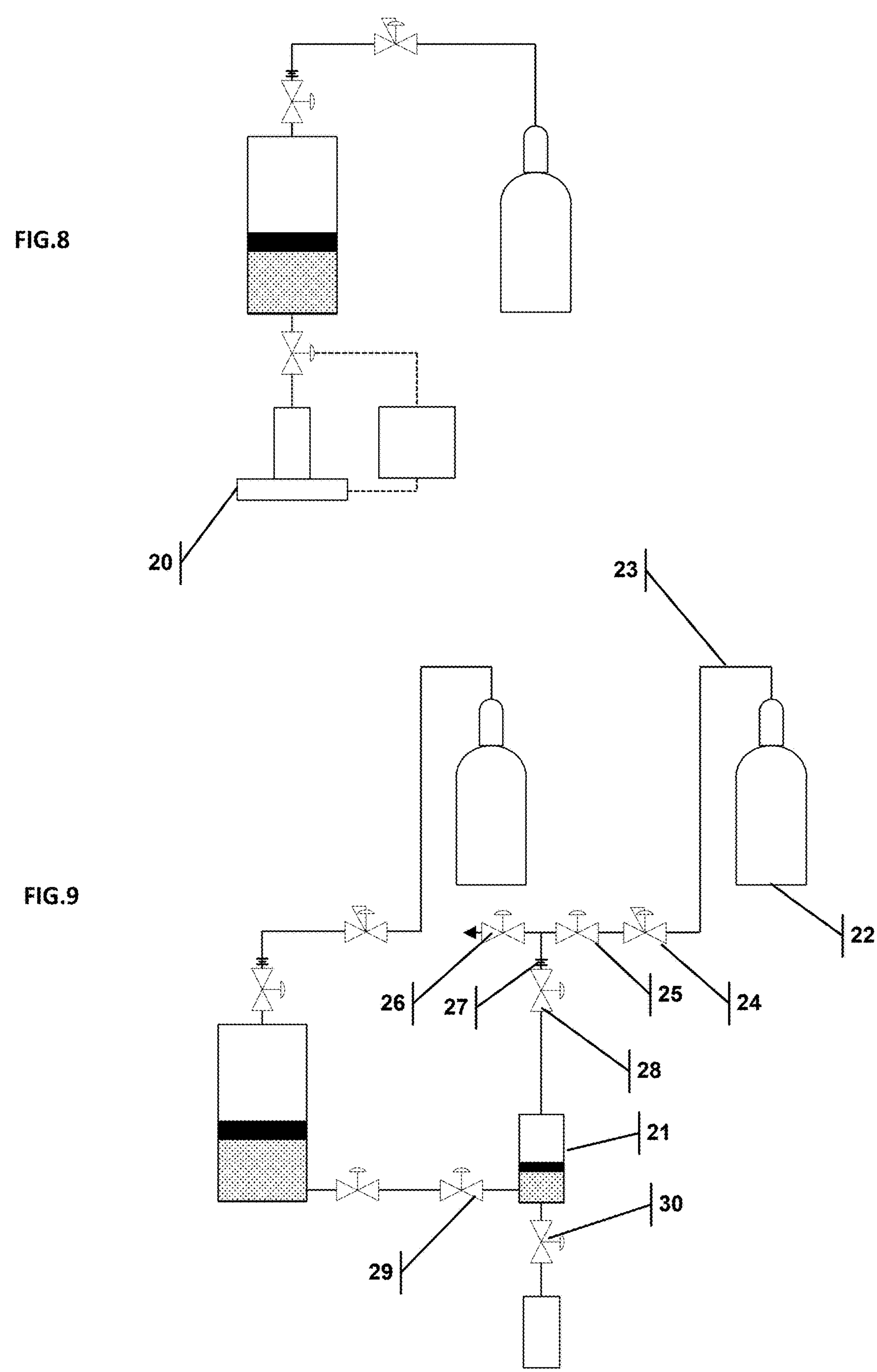
FIG. 8 is a block diagram showing a setup for LGE transfer from a CPC to an electrochemical cell, which further includes a scale.
FIG. 9 is a block diagram showing a setup for LGE transfer from a CPC to an electrochemical cell, which further includes a second CPC that has a volumetric capacity for a single electrochemical cell injection.

Another embodiment is illustrated in FIG. 8. In setup 1-8, the CPC product cavity 4 is fluidly connected to the electrochemical cell 6 through a valve 10. The electrochemical cell 6 may be positioned on a scale 20 so that the mass of LGE 5 delivered to the electrochemical cell 6 is monitored and the signal used to close valve 10 through a CPU 17 when the target LGE 5 mass is delivered.

Another embodiment is illustrated in FIG. 9. In setup 1-9, the CPC product cavity 4 is fluidly connected to the electrochemical cell 6 through a second CPC 21, a valve 29, and a valve 30. The second CPC 21 may have an internal volume equal to the volume of LGE 5 that is required to fill electrochemical cell 6. The second CPC 21 may be re-filled from CPC 1 upon subsequent electrochemical cell injections. In this setup the CPC 1 may be a much larger volume than the second CPC 21 to maximize the quantity of electrochemical cells injected with LGE 5. The smaller volume second CPC 21 may provide improved LGE 5 delivery accuracy by minimizing LGE 5 delivery error. One of ordinary skill in the art will recognize that a CPC with a product cavity sized to match the volume of LGE required to fill the electrochemical cell may provide improved accuracy. The second CPC 21 may be connected to a second compressed gas source 22 through a second tubing 23, a second regulator 24, a second orifice 27, valve 25 and valve 28. The valve 26 may be fluidly connected between CPC 21 and valve 25 to allow the compressed gas to vent from CPC 21 as it refills with LGE 5 from CPC 1.

Figures 10, 11:
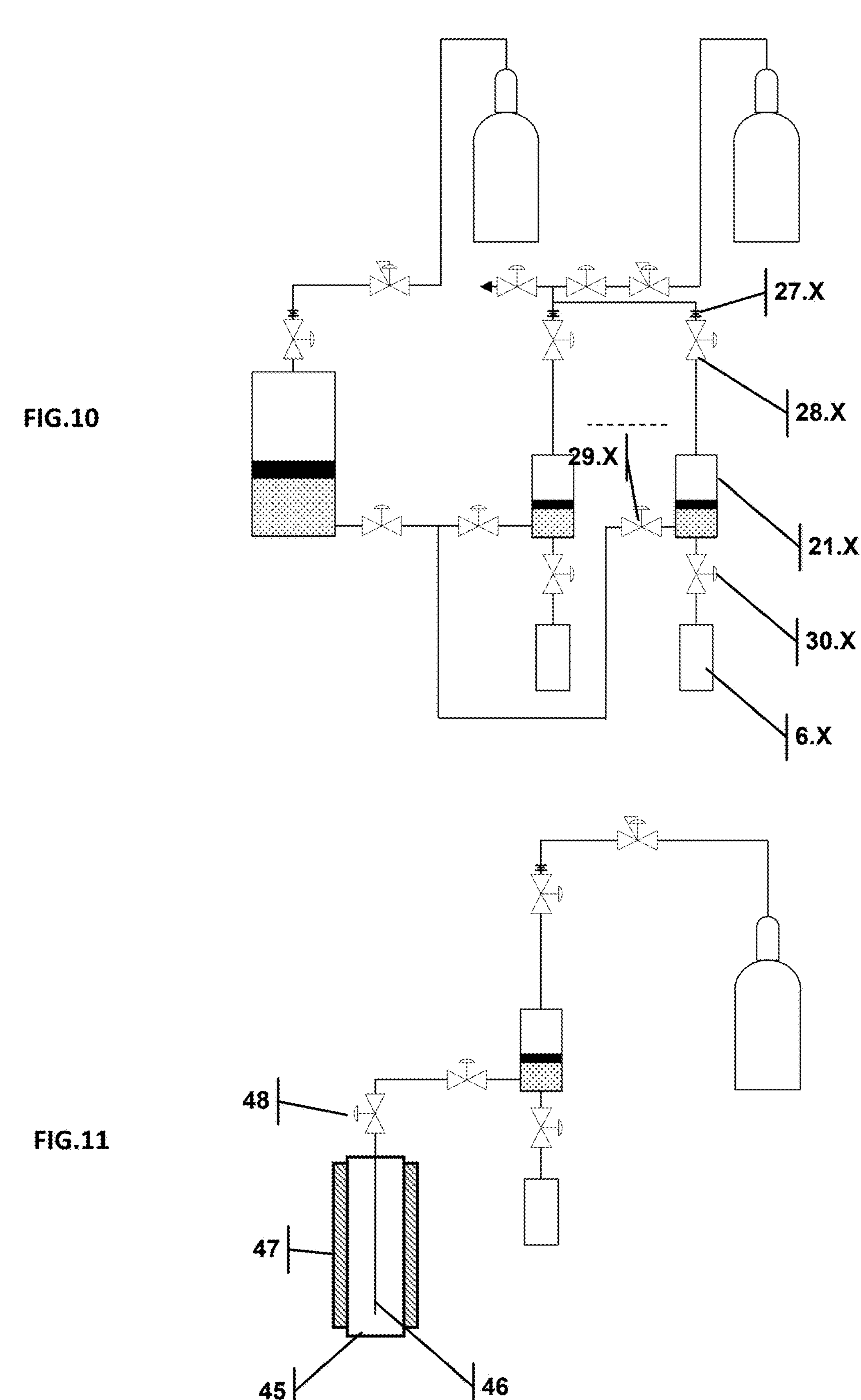
FIG. 10 is a block diagram showing a setup for LGE transfer from a CPC to one or more electrochemical cells, which includes one or more electrolyte delivery lines.
FIG. 11 is a block diagram showing a setup for LGE transfer from a CPC to an electrochemical cell, which further includes a container of LGE to supply LGE to the CPC.

Another embodiment is illustrated in FIG. 10. In setup 1-10, the CPC product cavity 4 is fluidly connected to two or more injection lines. This embodiment may be extended to any plurality of injection lines (shown as CPC 21.X, electrochemical cell 6.X, orifice 27.X, valve 28.X, valve 29.X, and valve 30.X). This setup may provide a higher throughput LGE filling process for electrochemical cells.

Another embodiment is illustrated in FIG. 11. In setup 1-11, a container 45 with LGE 5 is fluidly connected to a CPC 1 through a valve 48 and an eductor tube 46. The container 45 may be temperature controlled using a heating element 47. In this setup, the CPC 1 may improve the accuracy of LGE 5 delivery to the electrochemical cell 6. The state of the art does not utilize a CPC for delivering LGE to electrochemical cells, but instead uses a static volume container. One of ordinary skill in the art would recognize that the composition of the LGE 5 may change as LGE 5 is transferred from a static volume container to the electrochemical cell 6 due to the vaporization of components from the LGE 5 into any space outside the electrochemical cell. Therefore, in this setup, the CPC 1 may improve the accuracy of LGE 5 delivery to the electrochemical cell 6.

Figures 12, 13:
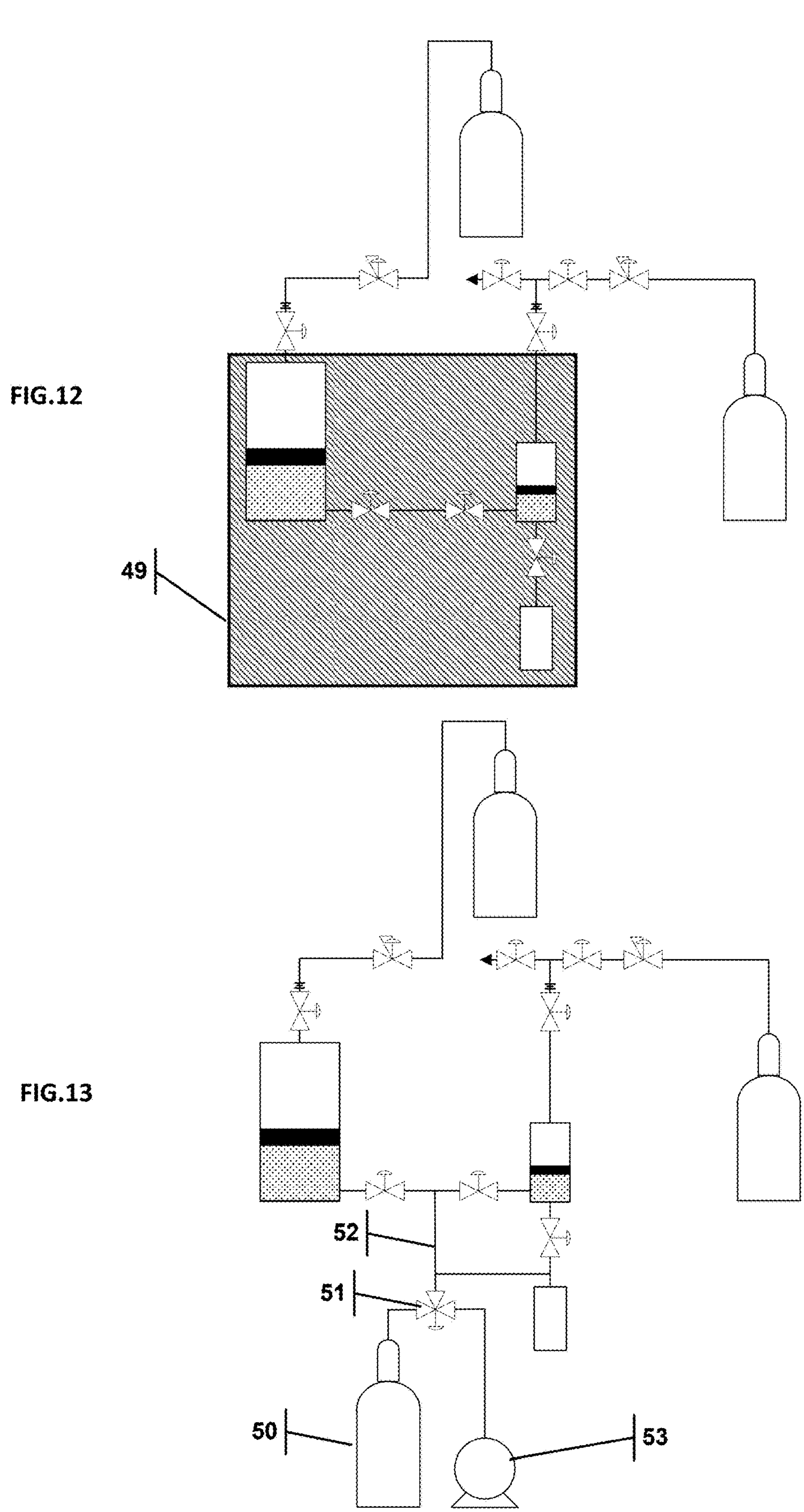
FIG. 12 is a block diagram showing a setup for LGE transfer from a CPC to an electrochemical cell, which further includes a temperature control element to control the temperature of the setup.
FIG. 13 is a block diagram showing a setup for LGE transfer from a CPC to an electrochemical cell, which further includes an inert gas supply and a vacuum pump connected to the tubing to remove water and oxygen from the setup.

Another embodiment is illustrated in FIG. 12. Setup 1-12 consists of the same elements as setup 1-7, and includes a temperature control element 49 that maintains a uniform temperature of all components where the LGE 5 may be present. One of ordinary skill in the art will recognize that maintaining a uniform LGE temperature will improve accuracy by maintaining a consistent liquid density across the setup.

Another embodiment is illustrated in FIG. 13. Setup 1-13 consists of the same elements as setup 1-7, and includes an inert gas source 50, a vacuum pump 53, and a valve 51 fluidly connected to the tubing 52 between the CPC 1 and the electrochemical cell 6. The inert gas source 50, vacuum pump 53, and valve 51 may be used to evacuate and purge atmospheric contaminants such as water and oxygen from the tubing 52.

While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An apparatus for dispensing a liquefied gas electrolyte (LGE) into an electrochemical cell, comprising:

a compressed gas source;

a constant pressure cylinder (CPC) comprising a cylinder body, a pneumatic cavity, a piston, and a product cavity configured to contain the LGE;

a pressure regulator fluidly connecting the compressed gas source to the pneumatic cavity, the pressure regulator configured to pressurize the pneumatic cavity to a pressure greater than a vapor pressure of the LGE, thereby maintaining the LGE entirely in a liquid phase within the product cavity; and tubing fluidly connecting the product cavity to the electrochemical cell.

2. The apparatus of claim 1, further comprising a first valve fluidly connecting the product cavity to the electrochemical cell, the first valve configured to isolate the CPC from the electrochemical cell after dispensing the LGE.

3. The apparatus of claim 1, further comprising a second valve fluidly connecting the pressure regulator to the pneumatic cavity, the second valve configured to isolate the CPC from the compressed gas source.

4. The apparatus of claim 3, further comprising an orifice fluidly positioned between the pressure regulator and the second valve, the orifice configured to restrict flow of compressed gas to the pneumatic cavity and dampen pressure changes therein.

5. The apparatus of claim 1, further comprising a loading volume fluidly positioned between the product cavity and the electrochemical cell, the loading volume sized to contain a predetermined volume of LGE for the electrochemical cell.

6. The apparatus of claim 5, further comprising a heating element configured to control a temperature of the loading volume.

7. The apparatus of claim 1, further comprising a pump fluidly positioned between the product cavity and the electrochemical cell, the pump configured to facilitate flow of the LGE into the electrochemical cell.

8. The apparatus of claim 1, further comprising a mass flow meter (MFM) fluidly positioned between the product cavity and the electrochemical cell, the MFM configured to monitor a mass of LGE dispensed.

9. The apparatus of claim 1, further comprising a mass flow controller (MFC) fluidly positioned between the product cavity and the electrochemical cell, the MFC configured to control a flow rate and monitor a mass of LGE dispensed.

10. The apparatus of claim 1, further comprising an orifice fluidly positioned between the product cavity and the electrochemical cell, the orifice sized to deliver the LGE at a predetermined flow rate.

11. The apparatus of claim 1, further comprising a scale configured to support the electrochemical cell and monitor a mass of LGE dispensed thereto.

12. The apparatus of claim 1, further comprising a second CPC fluidly positioned between the first CPC and the electrochemical cell, the second CPC having a smaller volumetric capacity than the first CPC and sized for a single injection into the electrochemical cell.

13. The apparatus of claim 12, further comprising a second compressed gas source fluidly connected to a pneumatic cavity of the second CPC, and a relief valve configured to vent gas from the second CPC during refilling with LGE from the first CPC.

14. The apparatus of claim 1, further comprising a plurality of parallel delivery lines fluidly connected to the product cavity, each line configured to dispense LGE to a respective electrochemical cell.

15. The apparatus of claim 1, further comprising a supply container fluidly connected to the product cavity via an eductor tube, the supply container configured to supply LGE to the CPC.

16. The apparatus of claim 15, further comprising a heating element configured to control a temperature of the supply container.

17. The apparatus of claim 1, further comprising at least one temperature control element configured to maintain a uniform temperature of the LGE across the apparatus.

18. The apparatus of claim 1, further comprising an inert gas source and a vacuum pump fluidly connected to the tubing, configured to evacuate and purge atmospheric contaminants from the apparatus.

19. A method of dispensing a liquefied gas electrolyte (LGE) into an electrochemical cell using the apparatus of claim 1, comprising:

pressurizing the pneumatic cavity to a pressure greater than the vapor pressure of the LGE;

transferring the LGE from the product cavity to the electrochemical cell while maintaining the LGE in the liquid phase.

20. The method of claim 19, further comprising monitoring the mass or flow rate of the LGE during transfer and controlling the transfer based thereon.

* * * * *